US012452155B1

(12) United States Patent
Gaudino et al.

(10) Patent No.: US 12,452,155 B1
(45) Date of Patent: Oct. 21, 2025

(54) ESTIMATING UPSTREAM UTILIZATION WITHIN A SERVICE PROVIDER NETWORK

(71) Applicant: CSC HOLDINGS, LLC, Bethpage, NY (US)

(72) Inventors: Vito Gaudino, Massapequa, NY (US); Arman Quadri, Lindenhurst, NY (US); Gustavo Monne, Holbrook, NY (US)

(73) Assignee: CSC HOLDINGS, LLC, Bethpage, NY (US)

( * ) Notice: Subject to any disclaimer, the term of this patent is extended or adjusted under 35 U.S.C. 154(b) by 302 days.

(21) Appl. No.: 18/306,465

(22) Filed: Apr. 25, 2023

(51) Int. Cl.
*H04L 43/0876* (2022.01)
*H04L 12/28* (2006.01)
*H04L 47/70* (2022.01)

(52) U.S. Cl.
CPC ...... *H04L 43/0876* (2013.01); *H04L 12/2801* (2013.01); *H04L 47/82* (2013.01)

(58) Field of Classification Search
None
See application file for complete search history.

(56) References Cited

U.S. PATENT DOCUMENTS

| | | | | |
|---|---|---|---|---|
| 8,949,918 B2 * | 2/2015 | Totten | ............ | H04B 10/25751 725/111 |
| 9,497,053 B2 * | 11/2016 | Zhang | .............. | H04L 5/0051 |
| 10,516,435 B1 * | 12/2019 | Jin | .............. | H04L 43/00 |
| 10,568,128 B2 * | 2/2020 | Li | .............. | H04W 72/23 |
| 10,892,984 B1 * | 1/2021 | Statton | .............. | H04L 41/0668 |
| 11,324,006 B2 * | 5/2022 | Yang | .............. | H04L 5/0082 |
| 11,363,629 B2 * | 6/2022 | Zhuang | .............. | H04W 72/0446 |
| 11,445,498 B2 * | 9/2022 | Alriksson | .............. | H04L 5/0007 |
| 11,470,549 B2 * | 10/2022 | Mehta | .............. | H04W 72/12 |
| 11,683,194 B2 * | 6/2023 | Foley | .............. | H04N 7/102 370/468 |
| 11,843,641 B2 * | 12/2023 | Straub | .............. | H04L 67/568 |
| 11,849,481 B2 * | 12/2023 | Zhang | .............. | H04L 1/1614 |
| 12,095,696 B2 * | 9/2024 | Shimezawa | .............. | H04L 5/0051 |
| 12,112,611 B2 * | 10/2024 | Ganster | .............. | H04L 65/61 |
| 12,130,340 B2 * | 10/2024 | Couch | .............. | G01R 31/52 |
| 12,143,262 B2 * | 11/2024 | Zinevich | .............. | H04L 1/0071 |
| 12,143,845 B2 * | 11/2024 | Kim | .............. | H04W 76/27 |
| 12,224,966 B2 * | 2/2025 | Frenne | .............. | H04L 5/0051 |
| 2018/0176147 A1 * | 6/2018 | Andreoli-Fang | .... | H04W 72/23 |
| 2024/0107455 A1 * | 3/2024 | Xu | .............. | H04W 52/0216 |
| 2024/0129936 A1 * | 4/2024 | Ganesan | .............. | H04W 72/40 |
| 2025/0150234 A1 * | 5/2025 | Manolakos | .......... | H04W 72/40 |

\* cited by examiner

*Primary Examiner* — Melvin H Pollack
(74) *Attorney, Agent, or Firm* — Lowenstein Sandler LLP (57) ABSTRACT

Systems, methods, and apparatuses disclosed herein can monitor an upstream direction. These systems, methods, and apparatuses can analyze the upstream direction to numerically quantify an upstream utilization of the upstream direction. These systems, methods, and apparatuses can analyze the upstream utilization of the upstream direction to identify whether a minislot bug is present or absent within the upstream direction. These systems, methods, and apparatuses can thereafter perform one or more corrective actions to remedy the minislot bug wen present in the upstream direction.

20 Claims, 4 Drawing Sheets

ESTIMATING UPSTREAM UTILIZATION WITHIN A SERVICE PROVIDER NETWORK

BACKGROUND

Data Over Cable Service Interface Specification (DOCSIS) is a globally recognized standard that enables transfer of electronic information over guided transmission mediums, such as one or more twisted pair cables, one or more Ethernet cables, one or more coaxial cables, and/or one or more optical fiber cables to provide some examples. In some situations, these guided transmission mediums can be part of a hybrid fiber-coaxial (HFC) network that combines the one or more optical fiber cables and the one or more coaxial cables and/or a fiber to the home (FTTH) network that utilizes the one or more optical fiber cables. Generally, the DOCSIS standard outlines a request/grant mechanism that allows one or more conventional subscriber premises to communicate with a conventional service provider system in an upstream direction. As part of the request/grant mechanism, the one or more conventional subscriber premises wanting to transfer the electronic information can send requests to the conventional service provider system. Thereafter, the conventional service provider system can allocate, or grant, upstream bandwidth in the form of one or more minislots to the one or more conventional subscriber premises wanting to transfer the electronic information to the service provider system as part of the request/grant mechanism.

In some situations, the one or more conventional subscriber premises can request more upstream bandwidth from the conventional service provider system then is necessary to transfer the electronic information to the conventional service provider system as part of the request/grant mechanism that can result a minislot bug. As a result of the minislot bug, the conventional service provider system can allocate, or grant, more minislots to the conventional subscriber premises then is necessary to transfer the electronic information to the conventional service provider system as part of the request/grant mechanism. And because the upstream direction is shared among the conventional subscriber premises, the minislot bug prevents the conventional service provider system from allocating, or granting, access to the upstream direction to other one or more conventional subscriber premises to transfer the electronic information to the conventional service provider system.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

The present disclosure will now be described with reference to the accompanying drawings.

DETAILED DESCRIPTION OF THE DISCLOSURE

The following disclosure provides many different embodiments, or examples, for implementing different features of the provided subject matter. Specific examples of components and arrangements are described below to simplify the present disclosure. These are, of course, merely examples and are not intended to be limiting. Aspects of the present disclosure are best understood from the following detailed description when read with the accompanying figures. The present disclosure may repeat reference numerals and/or letters in the various examples. This repetition does not in itself dictate a relationship between the various embodiments and/or configurations discussed. It is noted that, in accordance with the standard practice in the industry, features are not drawn to scale. In fact, the dimensions of the features may be arbitrarily increased or reduced for clarity of discussion.

Overview

Systems, methods, and apparatuses disclosed herein can monitor an upstream direction. These systems, methods, and apparatuses can analyze the upstream direction to numerically quantify an upstream utilization of the upstream direction. These systems, methods, and apparatuses can analyze the upstream utilization of the upstream direction to identify whether a minislot bug is present or absent within the upstream direction. These systems, methods, and apparatuses can thereafter perform one or more corrective actions to remedy the minislot bug wen present in the upstream direction.

Exemplary Service Provider Network

Figure 1:
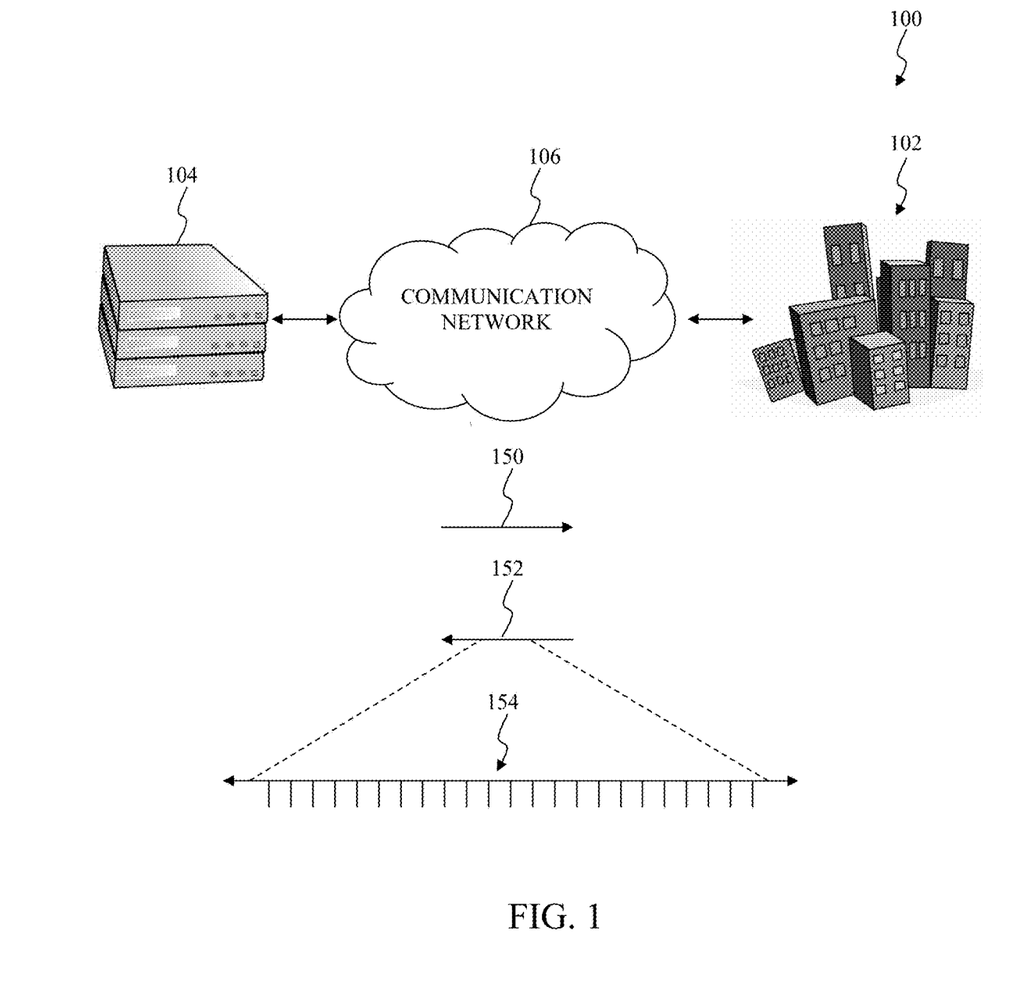
FIG. 1 graphically illustrates an exemplary service provider network according to some exemplary embodiments of the present disclosure.

FIG. 1 graphically illustrates an exemplary service provider network according to some exemplary embodiments of the present disclosure. In the exemplary embodiment illustrated in FIG. 1, a service provider network 100 provides electronic communication between subscriber premises 102 and a service provider system 104. In some embodiments, the service provider system 104 can deliver electronic information, such as video, audio, and/or data to provide some examples, to the subscriber premises 102 in a downstream direction 150. As used herein, the downstream direction 150 refers to the transfer of the electronic information from the service provider system 104 to the subscriber premises 102. In some embodiments, the subscriber premises 102 can similarly deliver the electronic information to the service provider system 104 in an upstream direction 152. As used herein, the upstream direction 152 refers to the transfer of the electronic information from the subscriber premises 102 to the service provider system 104. As to be described in further detail, the service provider system 104 can monitor upstream utilization of the upstream direction 152 by the subscriber premises 102. In some embodiments, the service provider system 104 can cause the subscriber premises 102 to perform one or more corrective actions in response to the upstream utilization efficiency of the upstream direction 152 by the subscriber premises 102 as to be described in further detail. In these embodiments, the service provider system 104 can analyze minislot utilization and/or traffic utilization of the upstream direction 152 by the subscriber premises 102 to determine whether to the subscriber premises 102 are to perform the one or more corrective actions. In the exemplary embodiment illustrated in FIG. 1, the service provider network 100 includes the subscriber premises 102 and the service provider system 104 that are communicatively coupled to one another via a communication network 106.

The subscriber premises 102 represent building and/or non-building structures that receive the service from the service provider network 100. Generally, the one or more building structures refer to any suitable structure or structures that are designed for human occupancy and can include one or more residential, industrial, and/or commercial building structures to provide some examples. Generally, the one or more non-building structures refer to any suitable structure or structures that are not designed for human occupancy and can include one or more residential, industrial, and/or commercial non-building structures to provide some examples. In some embodiments, the subscriber premises 102 can include one or more mechanical, electrical, and/or electronic devices communicatively coupled to the service provider system 104. In these embodiments, the one or more mechanical, electrical, and/or electro-mechanical devices can include any suitable mechanical, electrical, and/or electro-mechanical device, or devices, that are capable of receiving the electronic information from the service provider system 104 in the downstream direction 150 and/or delivering the electronic information to the service provider system 104 in the upstream direction 152. In these embodiments, these suitable mechanical, electrical, and/or electro-mechanical device, or devices, can include mobile telephony devices, such as mobile phones, mobile computing devices, mobile internet devices, such as tablet computers and/or laptop computers, video game consoles, portable media players, peripheral devices, such as wireless speakers, mice, keyboards, monitors, printers, and/or scanners, internet capable appliances, smart televisions, wireless routers, cable modems, set-top boxes and/or digital subscriber line (DSL) modems, and/or other suitable mechanical, electrical, and/or electro-mechanical devices that are capable of wireless communication that will be recognized by those skilled in the relevant art(s) without departing from the spirit and scope of the present disclosure. Although the discussion to follow can describe the subscriber premises 102 as performing certain actions, it should be appreciated that such descriptions are merely for convenience and that such actions in fact result from the operation of the one or more mechanical, electrical, and/or electro-mechanical devices included within the subscriber premises 102 as will be recognized by those skilled in the relevant art(s) without departing from the spirit and scope of the present disclosure.

The service provider system 104 represents one or more computer systems, an exemplary embodiment of which is to be described in further detail below, which manages transfer of the electronic information in the upstream direction 152 and/or the downstream direction 150 between the subscriber premises 102 and the service provider system 104. In some embodiments, the transfer of the electronic information in the upstream direction 152 and/or the downstream direction 150 can be outlined in one or more wireline communication standards or protocols. These wireline communication standards or protocols can include a version of an Institute of Electrical and Electronics Engineers (IEEE) 802.3 communication standard, also referred as Ethernet, such as 50G Ethernet, 100G Ethernet, 200G Ethernet, and/or 400G Ethernet to provide some examples, a version of a Data Over Cable Service Interface Specification (DOCSIS) communication standard, such as DOCSIS 3.0, DOCSIS 3.1, and/or DOCSIS 3.1 Full Duplex to provide some examples, and/or or any other wireline communication standard that will be apparent to those skilled in the relevant art(s) without departing from the spirit and scope of the present disclosure.

In the exemplary embodiment illustrated in FIG. 1, the subscriber premises 102 share the upstream resources in the upstream direction 152 with one another in accordance with, for example, Time Division Multiple Access (TDMA) and/or Orthogonal Frequency-Division Multiple Access (OFDMA). As such, one or more subscriber premises from among the subscriber premises 102 wanting to transfer the electronic information to the service provider system 104 can request upstream bandwidth to access the upstream direction 152 from the service provider system 104. In some embodiments, the subscriber premises 102 and the service provider system 104 can implement a request/grant mechanism as outlined by, for example, the DOCSIS communication standard to request the upstream bandwidth to access the upstream direction 152 from the subscriber premises 102. As part of the request/grant mechanism, the one or more subscriber premises wanting to transfer the electronic information can send requests to the service provider system 104 that identifies these subscriber premises and/or amount of the electronic information, for example, length in bytes, waiting to be transferred to the service provider system 104. Thereafter, the service provider system 104 can allocate, or grant, upstream bandwidth in the upstream direction 152 to the one or more subscriber premises in the form of one or more time slots, for example, one or more minislots from among minislots 154 as outlined by the DOCSIS communication standard, as part of the request/grant mechanism. In some embodiments, the service provider system 104 provides grant messages, for example, bandwidth allocation map (MAP) messages as outlined by the DOCSIS communication standard, to the one or more subscriber premises wanting to transfer the electronic information that identifies these subscriber premises, when these subscriber premises can transfer the electronic information, and/or amount of the electronic information, for example, length in bytes, that can be transferred to the service provider system 104 over the upstream direction 152.

In the exemplary embodiment illustrated in FIG. 1, the service provider system 104 can analyze the electronic traffic over the upstream direction 152 to estimate an upstream utilization of the upstream direction 152. In some embodiments, the service provider system 104 can monitor multiple characteristics, parameters, and/or attributes of the upstream direction 152, for example, minislot utilization of the upstream direction 152 and/or traffic utilization of the upstream direction 152. In these embodiments, the service provider system 104 can analyze the multiple characteristics, parameters, and/or attributes of the upstream direction 152, for example, minislot utilization of the upstream direction 152 and/or traffic utilization of the upstream direction 152, to numerically quantify the upstream utilization of the upstream direction 152. In these embodiments, the service provider system 104 can compare the multiple characteristics, parameters, and/or attributes, for example, the minislot utilization and the traffic utilization, to one another to numerically quantify the upstream utilization of the upstream direction 152. Ideally, the multiple characteristics, parameters, and/or attributes of the upstream direction 152 be synchronized with respect to each other to indicate that the upstream direction 152 is efficiently being utilized by the subscriber premises 102 to transfer the electronic information to the service provider system 104. In some embodiments, the multiple characteristics, parameters, and/or attributes of the upstream direction 152 should match one another, for example, be approximately one to one, when overhead that is associated with the electronic information as outlined by the DOCSIS communication standard is neglected. However, in practice, the multiple characteristics, parameters, and/or attributes of the upstream direction 152 can diverge with respect to one another to indicate that the upstream direction 152 is no longer being efficiently being utilized by the subscriber premises 102 to transfer the electronic information to the service provider system 104. In some embodiments, one or more subscriber premises from among the subscriber premises can request more upstream bandwidth from the service provider system 104 then is necessary to transfer the electronic information to the service provider system 104 as part of the request/grant mechanism that can result a minislot bug. In these embodiments, the minislot bug can occur as a result of an impairment, such an error, a fault, and/or a failure to provide some examples, within the service provider network 100. As a result of the minislot bug, the service provider system 104 can allocate, or grant, more upstream bandwidth in the upstream direction 152, for example, more minislots from among the minislots 154, to the one or more subscriber premises then is necessary to transfer the electronic information to the service provider system 104 as part of the request/grant mechanism. And because the upstream direction 152 is shared among the subscriber premises 102, the minislot bug prevents the service provider system 104 from allocating, or granting, access to the upstream direction 152 to other subscriber premises from among the subscriber premises 102 to transfer the electronic information to the service provider system 104.

In some embodiments, the service provider system 104 can analyze the upstream utilization of the upstream direction 152, for example, the multiple characteristics, parameters, and/or attributes of the upstream direction 152, to identify whether the minislot bug is present within the service provider network 100. In some embodiments, the service provider system 104 can compare the multiple characteristics, parameters, and/or attributes of the upstream direction 152 with one or more absolute utilization thresholds to identify whether the minislot bug is present, namely, the multiple characteristics, parameters, and/or attributes of the upstream direction 152 diverge with respect to one another, or whether the minislot bug is absent, namely the multiple characteristics, parameters, and/or attributes of the upstream direction 152 are synchronized with respect to one another. Alternatively, or in addition to, the service provider system 104 can compare the multiple characteristics, parameters, and/or attributes of the upstream direction 152 relative to one another to identify whether the multiple characteristics, parameters, and/or attributes of the upstream direction 152 are synchronized or diverge with respect to one another. In some embodiments, the service provider system 104 can compare one or more differences between the multiple characteristics, parameters, and/or attributes of the upstream direction 152 with one or more relative utilization thresholds to identify whether the multiple characteristics, parameters, and/or attributes of the upstream direction 152 are synchronized or diverge with respect to one another. In these embodiments, the service provider system 104 can identify the multiple characteristics, parameters, and/or attributes of the upstream direction 152 as being synchronized with respect to one another when the one or more differences between the multiple characteristics, parameters, and/or attributes of the upstream direction 152 are within the one or more relative utilization thresholds or diverge with respect to one another when the difference between the multiple characteristics, parameters, and/or attributes of the upstream direction 152 are outside of the one or more relative utilization thresholds.

After identifying the multiple characteristics, parameters, and/or attributes of the upstream direction 152 diverge with respect to one another, the service provider system 104 can cause the subscriber premises 102 to perform the one or more corrective actions to remedy, for example, the minislot bug. In some embodiments, the service provider system 104 can cause the subscriber premises 102 in its entirety to perform the one or more corrective actions. In these embodiments, the service provider system 104 can send one or more commands to the subscriber premises 102 in its entirety to perform the one or more corrective actions. Alternatively, or in addition to, the service provider system 104 can cause one or more subscriber premises from among the subscriber premises 102. to perform the one or more corrective actions. In these embodiments, the service provider system 104 can send one or more commands to the one or more subscriber premises to perform the one or more corrective actions. In some embodiments, the service provider system 104 can implement a round robin approach, for example, based upon the amount of the electronic information transferred by the one or more subscriber premises to the service provider system 104 as described above and/or the number of time slots in the upstream direction 152 allocated, or granted, to the one or more subscriber premises, for example, the number of time slots in the upstream direction 152 allocated, or granted to the one or more subscriber premises, as described above. In these embodiments, the service provider system 104 can perform the one or more corrective actions starting with one or more subscriber premises from among the subscriber premises 102 that transferred the most electronic information and/or had been allocated, or granted, the most time slots. In these embodiments, the service provider system 104 can perform the one or more corrective actions on one or more subscriber premises from among the subscriber premises 102 that transferred the next most electronic information and/or been allocated, or granted, the next most time slots if the minislot utilization and the electronic traffic continue to diverge. In some embodiments, the one or more corrective actions can include one or more corrective reset actions, for example, as simple as a remote re-boot; however, more complicated corrective actions are possible, such as a corrective deregistration action, are possible without departing from the spirit and scope of the present disclosure. In some embodiments, the service provider system 104 can report one or more subscriber premises from among the subscriber premises 102 that caused the minislot utilization and the electronic traffic diverge with respect to one another in response to the minislot utilization and the traffic utilization being synchronized with respect to one another once again.

Figure 2:
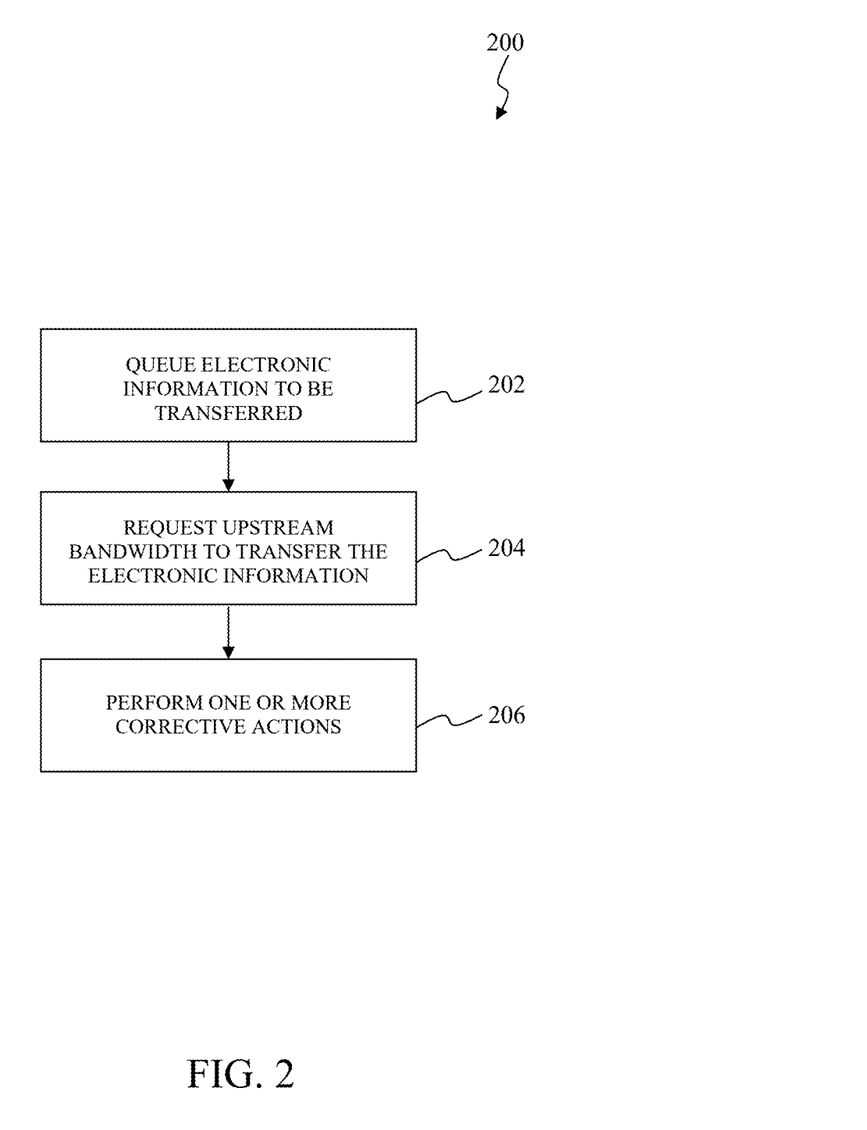
FIG. 2 illustrates a flowchart of an exemplary Data Over Cable Service Interface Specification (DOCSIS) compliant subscriber premises within the exemplary service provider network according to an exemplary embodiment of the present disclosure.

Exemplary Operation of an Exemplary Subscriber Premises within the Exemplary Service Provider Network FIG. 2 illustrates a flowchart of an exemplary Data Over Cable Service Interface Specification (DOCSIS) compliant subscriber premises within the exemplary service provider network according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 for the exemplary DOCSIS compliant subscriber premises having the minislot bug as described above. Although the discussion to follow can describe the exemplary subscriber premises as performing certain actions, it should be appreciated that such descriptions are merely for convenience and that such actions in fact result from the operation of one or more mechanical, electrical, and/or electro-mechanical devices included within the subscriber premises as will be recognized by those skilled in the relevant art(s) without departing from the spirit and scope of the present disclosure. In some embodiments, the exemplary DOCSIS compliant subscriber premises can be compliant with a version of the DOCSIS communication standard such as DOCSIS 3.0, DOCSIS 3.1, and/or DOCSIS 3.1 Full Duplex to provide some examples. The operational control flow 200 can be executed by one or more subscriber premises from among the subscriber premises 102 as described above.

At operation 202, the operational control flow 200 queues x-bytes of electronic information to be transferred to a service provider system of the exemplary service provider network, such as the service provider system 104 as described above. The electronic information can include video, audio, and/or data to provide some examples that is to be transferred to transferred to the service provider system over an upstream direction, such as the upstream direction 152 as described above.

At operation 204, the operational control flow 200 requests upstream bandwidth to access the upstream direction from the service provider system from operation 202 to transfer y-bytes of electronic information to the service provider system. In some embodiments, the y-bytes of electronic information is greater than the x-bytes of electronic information from operation 202. In these embodiments, the operational control flow 200 is requesting more upstream bandwidth from the service provider system at operation 204 then is necessary to transfer the x-bytes of electronic information from operation 202 to the service provider system resulting in the minislot bug. The minislot bug can occur as a result of an impairment, such an error, a fault, and/or a failure to provide some examples, within the subscriber premises to provide an example.

At operation 206, the operational control flow 200 performs one or more corrective actions to remedy, for example, the minislot bug from operation 204. In some embodiments, the service provider system from operation 202 can identify that the minislot bug from operation 204 is present by, for example, by analyzing the electronic traffic over the upstream direction from operation 202 as described above. In some embodiments, the operational control flow 200 can receive a command from the service provider system from operation 202 to perform the one or more corrective actions in response to the service provider system from operation 202 identifying that the minislot bug from operation 204 is present. In some embodiments, the one or more corrective actions can include one or more corrective reset actions, for example, as simple as a remote re-boot; however, more complicated corrective actions are possible, such as a corrective deregistration action, are possible without departing from the spirit and scope of the present disclosure.

Figure 3:
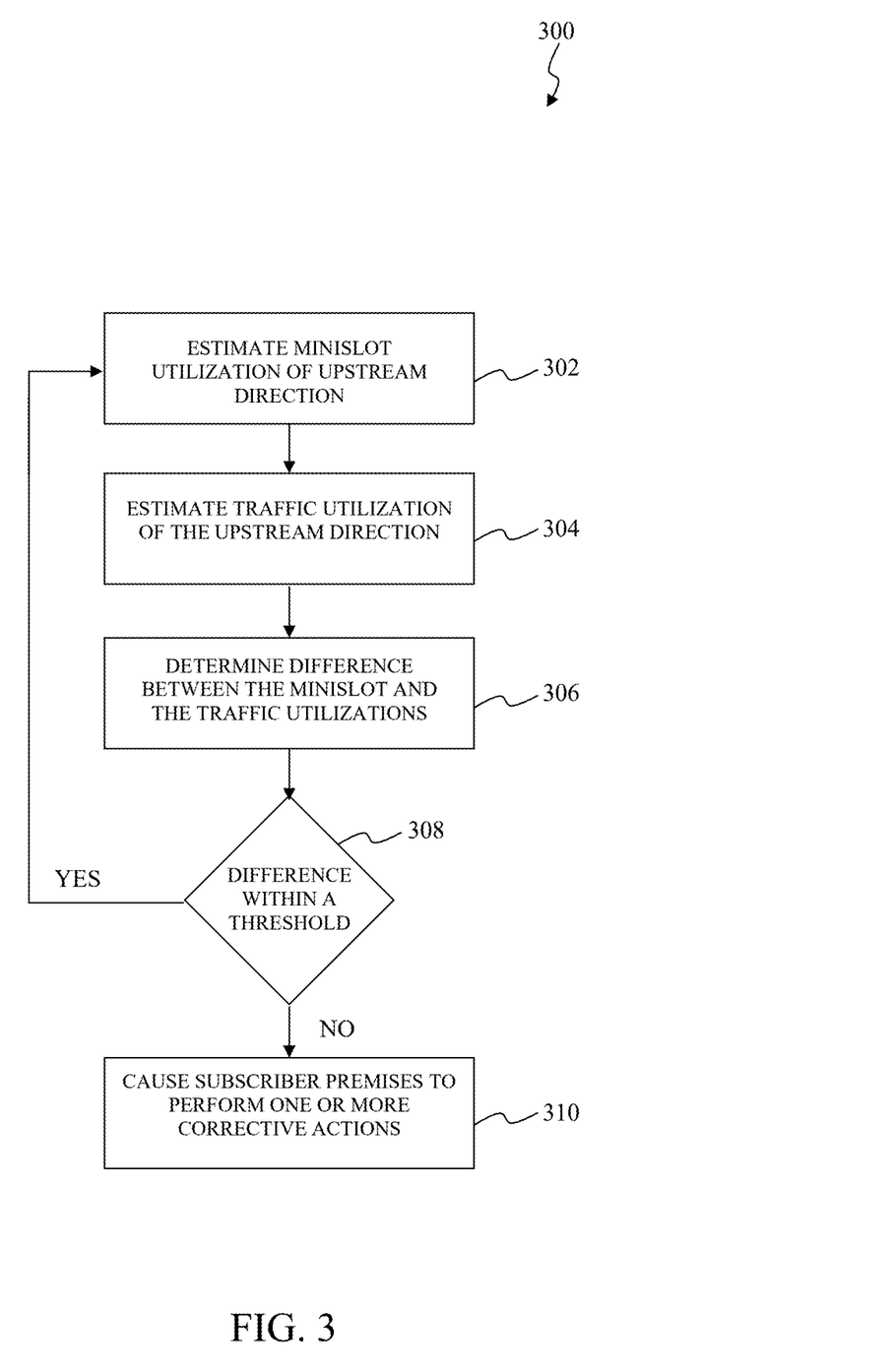
FIG. 3 illustrates a flowchart of an exemplary operation of an exemplary Data Over Cable Service Interface Specification (DOCSIS) compliant service provider system within the exemplary service provider network according to an exemplary embodiment of the present disclosure.

Exemplary Operation of an Exemplary Service Provider System within the Exemplary Service Provider Network FIG. 3 illustrates a flowchart of an exemplary operation of an exemplary Data Over Cable Service Interface Specification (DOCSIS) compliant service provider system within the exemplary service provider network according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 of the exemplary DOCSIS compliant service provider system in identifying the minislot bug as described above. In some embodiments, the exemplary DOCSIS compliant service provider system can be compliant with a version of the DOCSIS communication standard such as DOCSIS 3.0, DOCSIS 3.1, and/or DOCSIS 3.1 Full Duplex to provide some examples. The operational control flow 300 can be executed by the service provider system 104 as described above.

At operation 302, the operational control flow 300 estimates minislot utilization of an upstream direction, such as the upstream direction to provide an example. The minislot utilization represents an estimation of the number of minislots, for example, the number of minislots from among the minislots 154 as described above, that have been allocated, or granted, by the service provider system to one or more subscriber premises, such as one or more of the subscriber premises 102 as described above. For example, the minislot utilization can be expressed as a percentage as follows:

$$\text{minislot utilization} = \text{total number of granted minislots/total available minislots}, \quad (1)$$

where the minislot utilization represents a percentage of the total number of minislots from among the minislots in the upstream direction that have been granted to the one or more subscriber premises as described above. The total number of granted minislots represents the number of minislots from among the minislots that have been granted to the one or more subscriber premises as described above. In some embodiments, the total number of granted minislots can be expressed in terms of utilized contention minislots and/or unicast granted minislots. The total number of available minislots represents the number of minislots from among the minislots in the upstream direction that can be granted to the one or more subscriber premises as described above.

At operation 304, the operational control flow 300 estimates traffic utilization of the upstream direction. The traffic utilization represents an estimation of the amount of the upstream bandwidth of the upstream direction 152 being used to transfer the electronic information to the service provider system 104. For example, the traffic utilization can be expressed as a percentage as follows:

$$\text{traffic utilization} = \text{data transferred/interface speed} * 100, \quad (2)$$

where the traffic utilization represents a percentage of the upstream bandwidth of the upstream direction 152 being used to transfer the electronic information to the service provider system 104 as described above. The data transferred is an estimate of the amount of the electronic information transferred to the service provider system 104 over the upstream direction 152 often expressed in megabits (MBs) to provide an example. The interface speed represents a maximum bandwidth of the upstream direction 152 often expressed in megabits (MBs) to provide an example.

At operation 306, the operational control flow 300 determines a difference between the minislot utilization from operation 302 and the traffic utilization from operation 304. In some embodiments, the operational control flow 300 can analyze the minislot utilization from operation 302 and the traffic utilization from operation 304 to identify whether the minislot bug is present.

At operation 308, the operational control flow 300 can compare the difference from operation 306 with a utilization threshold to identify whether the minislot utilization and the traffic utilization are synchronized or diverge with respect to each other. In some embodiments, the operational control flow 300 can identify the minislot utilization from operation 302 and the traffic utilization from operation 304 as being synchronized with respect to each other when the difference from operation 302 is within the utilization threshold or diverge with respect to each other when the difference is outside of the utilization threshold. The operational control flow 300 can proceed to operation 310 when the difference is outside of the utilization threshold indicating the presence of the minislot bug. Otherwise, the operational control flow 300 can revert to operation 302 when the difference is within the utilization threshold indicating the absence of the minislot bug.

At operation 310, the operational control flow 300 can cause the one or more subscriber premises to perform one or more corrective actions to remedy, for example, the minislot bug. In some embodiments, the operational control flow 300 can send one or more commands to the one or more subscriber premises to perform the one or more corrective actions as described above.

Figure 4:
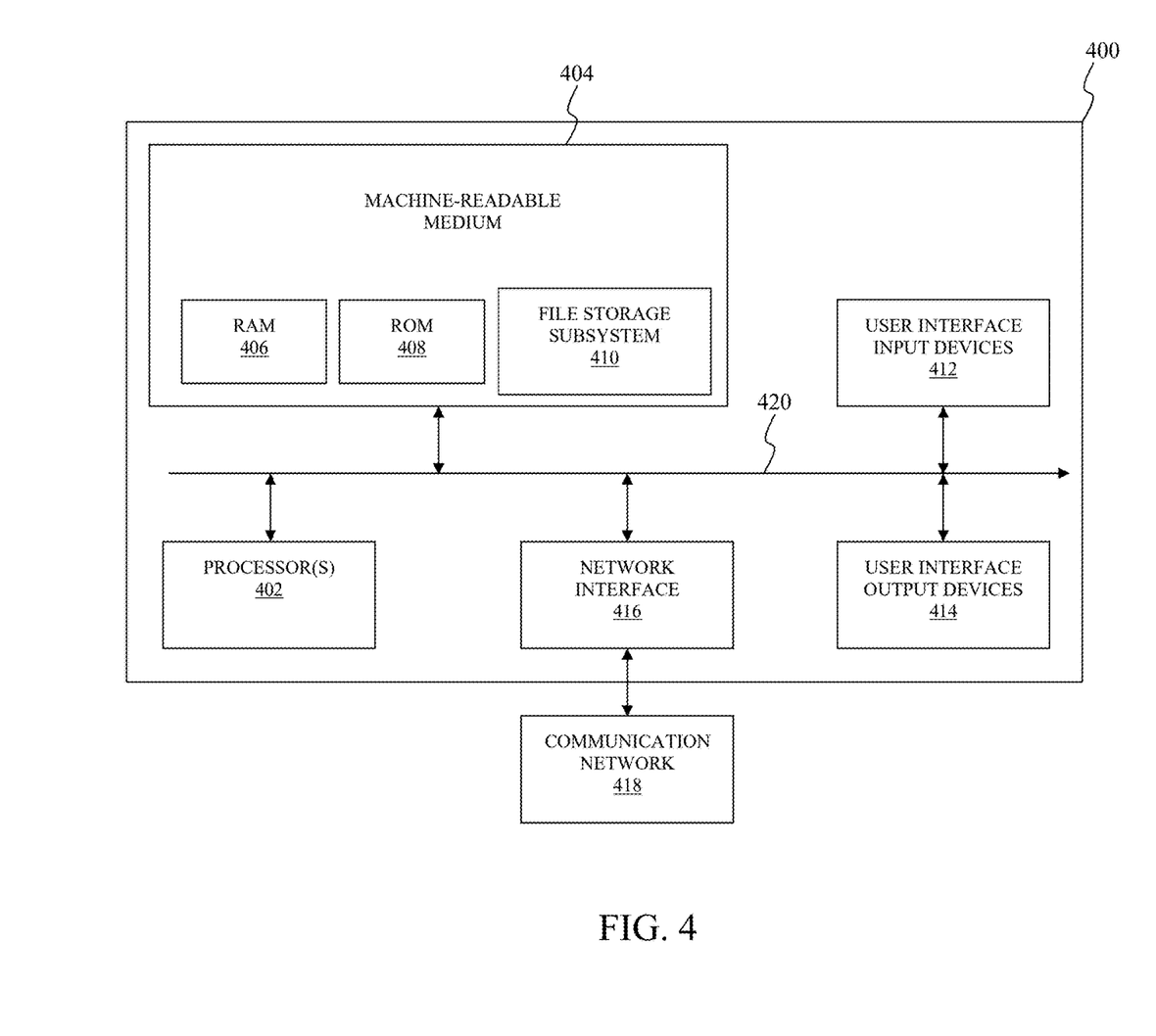
FIG. 4 graphically illustrates a simplified block diagram of a computing device that can be utilized to implement the exemplary service provider system according to some embodiments of the present disclosure.

Exemplary Computing Device that can be Utilized to Implement the Exemplary Service Provider System FIG. 4 graphically illustrates a simplified block diagram of a computing device that can be utilized to implement the exemplary service provider system according to some embodiments of the present disclosure. The discussion of FIG. 4 to follow is to describe a computing device 400 that can be used to implement the service provider system 104 as described above.

In the embodiment illustrated in FIG. 4, the computing device 400 includes one or more processors 402. In some embodiments, the one or more processors 402 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a collection of processors available at a distributed or remote system, these processors accessible via a communications network (e.g., the Internet) and via one or more software interfaces (e.g., an application program interface (API).) In some embodiments, the computing device 400 can include an operating system, such as Microsoft's Windows, Sun Microsystems's Solaris, Apple Computer's MacOs, Linux or UNIX. In some embodiments, the computing device 400 can also include a Basic Input/Output System (BIOS) and processor firmware. The operating system, BIOS and firmware are used by the one or more processors 402 to control subsystems and interfaces coupled to the one or more processors 402. In some embodiments, the one or more processors 402 can include the Pentium and Itanium from Intel, the Opteron and Athlon from Advanced Micro Devices, and the ARM processor from ARM Holdings.

As illustrated in FIG. 4, the computing device 400 can include a machine-readable medium 404. In some embodiments, the machine-readable medium 404 can further include a main random-access memory ("RAM") 406, a read only memory ("ROM") 408, and/or a file storage subsystem 410. The RAM 730 can store instructions and data during program execution and the ROM 732 can store fixed instructions. The file storage subsystem 410 provides persistent storage for program and data files, and may include a hard disk drive, a floppy disk drive along with associated removable media, a CD-ROM drive, an optical drive, a flash memory, or removable media cartridges.

The computing device 400 can further include user interface input devices 412 and user interface output devices 414. The user interface input devices 412 can include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices to provide some examples. The user interface input devices 412 can be connected by wire or wirelessly to the computing device 400. Generally, the user interface input devices 412 are intended to include all possible types of devices and ways to input information into the computing device 400. The user interface input devices 412 typically allow a user to identify objects, icons, text and the like that appear on some types of user interface output devices, for example, a display subsystem. The user interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as vian audio output or tactile output (e.g., vibrations) devices. Generally, the user interface output devices 420 are intended to include all possible types of devices and ways to output information from the computing device 400.

The computing device 400 can further include a network interface 416 to provide an interface to outside networks, including an interface to a communication network 418, and is coupled via the communication network 418 to corresponding interface devices in other computing devices or machines. The communication network 418 may comprise many interconnected computing devices, machines and communication links. These communication links may be wired links, optical links, wireless links, or any other devices for communication of information. The communication network 418 can be any suitable computer network, for example a wide area network such as the Internet, and/or a local area network such as Ethernet. The communication network 418 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

As illustrated in FIG. 4, the one or more processors 402, the machine-readable medium 404, the user interface input devices 412, the user interface output devices 414, and/or the network interface 416 can be communicatively coupled to one another using a bus subsystem 420. Although the bus subsystem 420 is shown schematically as a single bus, alternative embodiments of the bus subsystem may use busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A service provider system within a service provider network, the service provider system being compliant with a version of a Data Over Cable Service Interface Specification (DOCSIS) communication standard and comprising:
   a memory configured to store instructions; and
   a processor configured to execute the instructions, the instructions, when executed by the processor, configuring the processor to:
   monitor minislot utilization of an upstream direction and traffic utilization of the upstream direction to numerically quantify an upstream utilization of the upstream direction,
   determine that the minislot utilization and the traffic utilization diverge with respect to each other to identify a presence of a minislot bug within the service provider network, and
   cause a subscriber premises within the service provider network to perform a corrective action to remedy the minislot bug.

2. The service provider system of claim 1, wherein the minislot utilization comprises a percentage of minislots that have been allocated by the service provider system.

3. The service provider system of claim 1, wherein the traffic utilization comprises a percentage of upstream bandwidth of the upstream direction being used to transfer electronic information to the service provider system.

4. The service provider system of claim 1, wherein the instructions, when executed by the processor, configure the processor to compare the minislot utilization and the traffic utilization to determine whether the minislot utilization and the traffic utilization diverge with respect to each other.

5. The service provider system of claim 4, wherein the instructions, when executed by the processor, configure the processor to determine that the minislot utilization and the traffic utilization diverge with respect to each other when the difference is within a relative utilization threshold.

6. The service provider system of claim 4, wherein the instructions, when executed by the processor, configure the processor to determine that the minislot utilization and the traffic utilization do not diverge with respect to each other when the difference is outside of a relative utilization threshold.

7. The service provider system of claim 1, wherein the instructions, when executed by the processor, configure the processor to cause subscriber premises to perform a remote re-boot or a corrective deregistration action to remedy the minislot bug.

8. A method for operating a service provider system within a service provider network, the method comprising:
monitoring, by the service provider system that is compliant with a version of a Data Over Cable Service Interface Specification (DOCSIS) communication standard, minislot utilization of an upstream direction and traffic utilization of the upstream direction to numerically quantify an upstream utilization of the upstream direction;
determining, by the service provider system, whether the minislot utilization and the traffic utilization diverge with respect to each other to identify whether a minislot bug is present within the service provider network;
causing, by the service provider system, a subscriber premises within the service provider network to perform a corrective action in response to the utilization and the traffic utilization diverging with respect to each other; and
continue monitoring, by the service provider system, the minislot utilization and the traffic utilization of the upstream direction in response to the utilization and the traffic utilization not diverging with respect to each other.

9. The method of claim 8, wherein the minislot utilization comprises a percentage of minislots that have been allocated by the service provider system.

10. The method of claim 8, wherein the traffic utilization comprises a percentage of upstream bandwidth of the upstream direction being used to transfer electronic information to the service provider system.

11. The method of claim 8, wherein the determining comprises comparing the minislot utilization and the traffic utilization to determine whether the minislot utilization and the traffic utilization diverge with respect to each other.

12. The method of claim 11, wherein the determining further comprises determining that the minislot utilization and the traffic utilization diverge with respect to each other when the difference is within a relative utilization threshold.

13. The method of claim 11, wherein the determining further comprises determining that the minislot utilization and the traffic utilization do not diverge with respect to each other when the difference is outside of a relative utilization threshold.

14. The service provider system of claim 1, wherein the causing comprises causing the subscriber premises to perform a remote re-boot or a corrective deregistration action to remedy the minislot bug.

15. A service provider system within a service provider network, the service provider system comprising:
a memory configured to store instructions; and
a processor configured to execute the instructions, the instructions, when executed by the processor, configuring the processor to:
receive a request that outlined in accordance with a version of a Data Over Cable Service Interface Specification (DOCSIS) communication standard from a subscriber premises from among a plurality of subscriber premises within the service provider network to transfer electronic information to the service provider system,
send a bandwidth allocation map (MAP) messages as outlined by the version of the DOCSIS communication standard to grant one or more minislots from among a plurality of minislots of an upstream direction to the subscriber premises to transfer the electronic information to the service provider system,
monitor a plurality of characteristics, parameters, or attributes of the upstream direction,
analyze the plurality of characteristics, parameters, or attributes of the upstream direction to numerically quantify an upstream utilization of the upstream direction,
determine that the plurality of characteristics, parameters, or attributes with respect to one another other to identify a presence of a minislot bug within the service provider network, and
cause a subscriber premises within the service provider network to perform a corrective action to remedy the minislot bug.

16. The service provider system of claim 15, wherein the plurality of characteristics, parameters, or attributes of the upstream direction comprises a percentage of minislots that have been allocated by the service provider system.

17. The service provider system of claim 15, wherein the plurality of characteristics, parameters, or attributes of the upstream direction comprises a percentage of upstream bandwidth of the upstream direction being used to transfer electronic information to the service provider system.

18. The service provider system of claim 15, wherein the instructions, when executed by the processor, configure the processor to compare plurality of characteristics, parameters, or attributes of the upstream direction to determine whether plurality of characteristics, parameters, or attributes of the upstream direction diverge with respect to one another.

19. The service provider system of claim 17, wherein the instructions, when executed by the processor, configure the processor to determine that plurality of characteristics, parameters, or attributes of the upstream direction diverge with respect to one another when the difference is within a relative utilization threshold.

20. The service provider system of claim 17, wherein the instructions, when executed by the processor, configure the processor to cause subscriber premises to perform a remote re-boot or a corrective deregistration action to remedy the minislot bug.

* * * * *